Dec. 17, 1963     R. T. HEADRICK ETAL     3,114,343
HYDROFOIL APPARATUS
Filed April 18, 1960     3 Sheets-Sheet 1

INVENTORS.
RICHARD T. HEADRICK
EDWARD E. HEADRICK
BY
Christie, Parker & Hale
ATTORNEYS.

Dec. 17, 1963    R. T. HEADRICK ETAL    3,114,343
HYDROFOIL APPARATUS
Filed April 18, 1960    3 Sheets-Sheet 2

INVENTORS.
RICHARD T. HEADRICK
EDWARD E. HEADRICK
BY
Christie, Parker & Hale
ATTORNEYS.

Dec. 17, 1963   R. T. HEADRICK ETAL   3,114,343
HYDROFOIL APPARATUS
Filed April 18, 1960   3 Sheets-Sheet 3

INVENTORS.
RICHARD T. HEADRICK
EDWARD E. HEADRICK
BY
ATTORNEYS.

United States Patent Office 3,114,343
Patented Dec. 17, 1963

3,114,343
HYDROFOIL APPARATUS
Richard T. Headrick and Edward E. Headrick, La Canada, Calif., assignors to E & R Hydrofoil Company, Los Angeles, Calif., a limited partnership
Filed Apr. 18, 1960, Ser. No. 22,871
10 Claims. (Cl. 114—66.5)

The present invention relates to hydrofoil apparatus.

The potentialities of using hydrofoils to support high speed vessels or boats in water have long been recognized. The use of hydrofoils to partially or completely lift a boat above the surface of water by the relative motion between the hydrofoils and the water results in two fundamental advantages: (1) A smaller surface area is presented to the water by a hydrofoil as compared to a typical planning hull which results in decreasing the drag forces and thus increasing the efficiency of the boat, and (2) the conventional hydrofoil ordinarily holds the hull of the boat above the surface of the water which results in decreasing the sensitivity of the boat to surface conditions of the water and thus increasing the stability of the boat in pitch and roll. These advantages have been offset to a large extent in the past by the basic instability of the hydrofoils employed.

Heretofore, hydrofoils have been patterned after high lift section low-speed aircraft wings in which the chord or distance between the leading and trailing edges is substantially constant throughout the span of the wing.

The use of such conventional aircraft wing structures to produce lift by relative motion in water have resulted in several basic problems which have not been encountered in aircraft applications because of the totally different characteristics of the two media involved (e.g. air, a compressible fluid as compared with water, a non-compressible fluid). First, the lift produced by such conventional hydrofoils is both unpredictable and uncontrollable except at certain speeds. For example, most of the lift produced by a conventional hydrofoil is derived from the upper surface. As a result separation of water from the upper surface of such a foil by cavitation (or by the hydrofoil breaking the surface of the water), completely destroys the majority of the lift (i.e. 90%) produced by the foil. Cavitation results when the angle of incidence or attack of the hydrofoil reaches a particular value at a given speed. This loss of lift by cavitation has greatly restricted the permissible angle of attack of conventional hydrofoils and consequently the speed range of useful lift. Second, the center of pressure line in a conventional hydrofoil is coincident with the resultant center of lift. The struts, which are generally connected between the boat and the hydrofoil above the resultant center of lift thereof, permit air to pass down the rear of the strut and into the low pressure region of the hydrofoil and thus spoil the lift of the hydrofoil at high speeds as will be more fully explained.

The above disadvantages are overcome by the present invention which provides a hydrofoil apparatus that is highly efficient, cavitation resistant, and which produces predictable lift over a wide speed range. The hydrofoil apparatus of this invention also has a very wide range of permissible angles of incidence or attack which permits the apparatus to be used at low speeds (with a large angle of attack for high lift), and at very high speeds (with a small angle of attack). In accordance with this invention, a hydrofoil apparatus is provided for lifting a boat or other body in water which includes a plurality of delta-shaped body members. Each of the body members has a upper and lower surface which converge at an acute angle to form a pair of thin leading edges intersecting at the front of the body member and disposed symmetrically with respect to the longitudinal axis thereof. A strut member is connected individually between each of the body members and the boat for holding the body members in a preselected position below the boat so that the front ends of the body members are aligned with the direction of travel of the boat and for transmitting the lifting forces produced by the body members to the boat.

The invention is described in more detail in reference the accompanying drawing in which:

FIG. 1, a perspective view of a boat equipped with the hydrofoil apparatus of the present invention;

Figure 1:
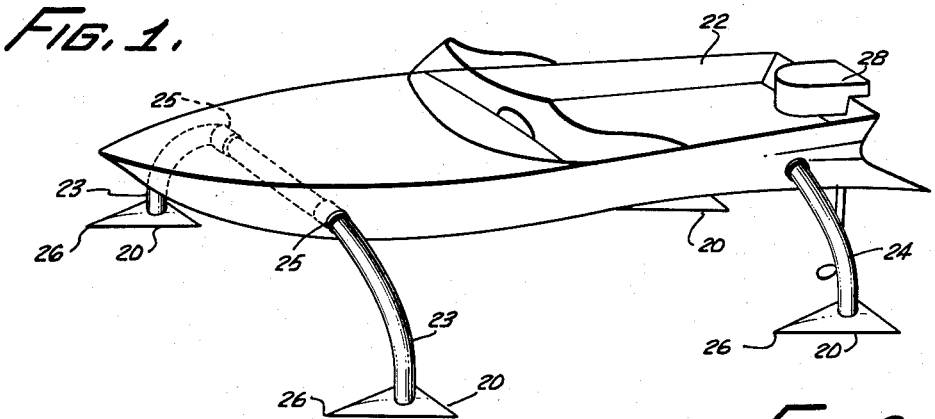
Figure 2:
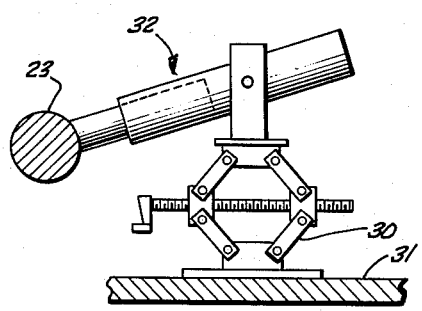
FIG. 2 is an enlarged view of a portion of the apparatus of FIG. 1 partly broken away.

Referring now to the drawing, more particularly to FIG. 1, four body members or hydrofoils 20 are secured to a boat 22 by means of struts 23 and 24 for supporting the boat 22 in a body of water as will be more fully described. The struts 23 and 24 hold the body members 20 in a preselected position below the boat so that the front ends 26 of the body members are aligned with the direction of travel of the boat. While four body members are illustrated as supporting the boat 22, any number of properly positioned body members may be used for this purpose. A source of power, such as an outboard motor 28, is connected to the boat 22 for propelling the boat through the water. To control the angle of incidence or attack of the body members in the water, means may be coupled to the struts to rotate the struts relative to the boat 22. For example, such means may include a scissor jack 30 secured to the keel 31 of the boat, and a telescoping arm assembly 32 connected between the jack 30 and the front struts 23 as shown in FIG. 2. The front struts 23 are rotatably mounted in bearings 25 as shown in FIG. 1. The rear struts 24 may be rotated in a similar manner to control the angle of attack of the body members attached thereto.

The body members or hydrofoils 20 in FIG. 1 produce a lifting force to hold the boat 22 above the surface of the water by virtue of pressure created on the lower surface and/or suction created on the upper surface of the hydrofoils. These lifting forces produced by the hydrofoils are accompanied by drag forces which must be overcome by the source of power propelling the boat through the water. The ratio of the lift to drag forces is an important figure of merit for a hydrofoil. There are, of course, other criteria such as stability (below and on the surface of the water) and range of operating speeds which are equally important in assessing the value of a particular hydrofoil for a particular application. Several different embodiments of the hydrofoil apparatus of the present invention are illustrated for different applications as will be described.

Before considering the hydrofoil apparatus of the present invention in detail it is helpful to very briefly consider some of the basic problems which have been encountered in using conventional hydrofoils (patterned after high lift section low-speed aircraft wings).

Figure 3:
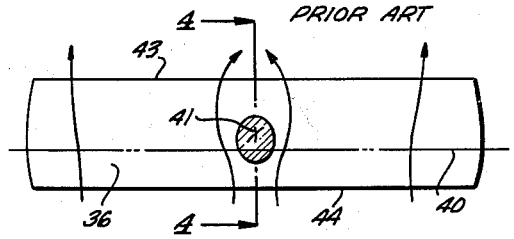
FIG. 3 is a plan view of a conventional hydrofoil of the prior art.
Figure 4:
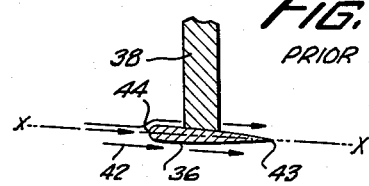
FIG. 4 is a cross-sectional view of the hydrofoil of FIG. 3 taken along lines 4—4.

Referring now to FIGS. 3 and 4 there is shown a prior art conventional hydrofoil 36 and a strut 38 connected to the top surface of the hydrofoil above the center of lift and the center of gravity thereof. The hydrofoil 36 has a center of pressure line 40 positioned just forward of the center of gravity 41 (see FIG. 3) for permissible angles of attack (the angle between the longitudinal axis X—X, FIG. 4, and the horizontal plane).

As the angle of attack of the hydrofoil 36 is increased at a given speed, cavitation starts taking place on the top surface (with a resultant loss of lift), and the center of pressure line 40 moves aft or behind the center of gravity 41 resulting in the loss of effective lift for the hydrofoil. Since the center of pressure line 40 is normally very close to the center of gravity 41, the permissible angle of attack of the hydrofoil 36 for all speeds is small. Also, the amount of cavitation taking place on the top surface of the hydrofoil 36 is dependent upon the speed as well as the angle of attack. As a result the permissible angle of attack for the hydrofoil 36 decreases as the speed increases.

Another problem of the conventional hydrofoil 36 is concerned with strut spoilage, that is at high speeds air from the atmosphere will bleed down the rear portion of strut 38 and around the base thereof into the low pressure region adjacent to the center of pressure line 40 and spoil the lift of the hydrofoil 36. The problems involved with the loss of lift in hydrofoils can be severe if the boat is traveling at high speeds since the hull of the boat will be abruptly dropped onto the surface of the water thereby transmitting large forces to the boat and to the occupants thereof. The prior art hydrofoil shown in FIGS. 3 and 4 forms no part of the present invention and is shown only for the purpose of clarifying some of the problems involved in the use of such hydrofoils.

Figure 5:
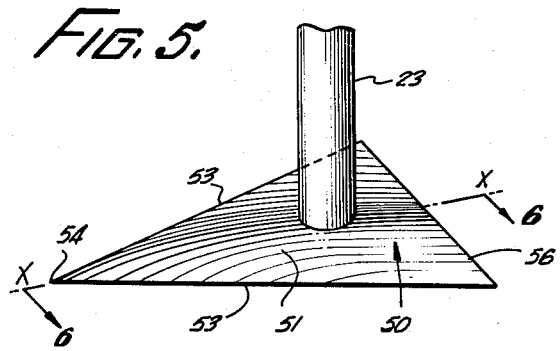
FIG. 5 is a perspective view of a hydrofoil apparatus in accordance with the present invention.
Figure 6:
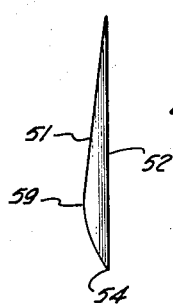
FIG. 6 is a cross-sectional view of the apparatus of FIG. 5 taken along lines 6—6.

Referring now to FIGS. 5 and 6 there is shown, in detail, an improved hydrofoil apparatus of the present invention in which a delta-shaped body member 50 has upper and lower surfaces 51 and 52 respectively. The upper and lower surfaces converge at an acute angle to form a pair of thin or sharp leading edges 53 intersecting at the front 54 of the body member and a thin trailing edge 56. The leading edges 53 are disposed symmetrically with respect to the longitudinal axis X—X at the rear of the body member 50. The body members 50 may be made of any suitable material such as metal, plastic, etc. It is only necessary that the material be erosion resistant in the liquid medium (i.e. water) in which the hydrofoil apparatus is to be used and have sufficient structural strength.

A plurality of the body members 50 may be secured to boat 22 by the struts 23 (FIG. 1) for holding the body members 50 so that the front ends thereof are aligned with the direction of travel of the boat.

Figure 8:
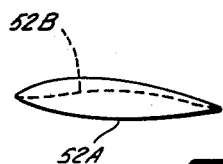
FIG. 8 is a sectional view of another embodiment of the apparatus of the present invention.

Referring now to FIG. 6, the surface contour of the top surface 51 of the body member 50 is shown in more detail. The top surface 51 is convex in shape along each longitudinal cross-section (each cross-section parallel to the longitudinal axis X—X) of the body member 50 and each longitudinal cross-section has the same relative dimensions as the cross-section shown in FIG. 6 with the top surface extending downwardly to the leading and trailing edges from a point approximately one-fourth to one-third the distance from the leading to the trailing edges. The top surface 51 is also convex in shape along each transverse cross-section, (e.g. each cross-section perpendicular to the longitudinal axis X—X). The degree of curvature of the top surface 51 may vary depending upon the particular characteristics desired. This top surface of the body member 50 produces a large lift with relatively small drag forces. The bottom surface of the body member 50 may be flat as shown in FIG. 6 or may be convex along each longitudinal cross-section as shown in FIG. 8 (surface 52A). A convex lower surface for the body member 50 reduces the lifting force resulting from the pressure exerted on the lower surface but also decreases the drag force on the lower surface 52. If desired, the lower surface may be concave along each longitudinal cross-section as indicated by the dashed lines 52B, FIG. 8. This configuration increases the pressure on the bottom surface resulting in greater lifting forces and greater drag forces.

Figure 7:
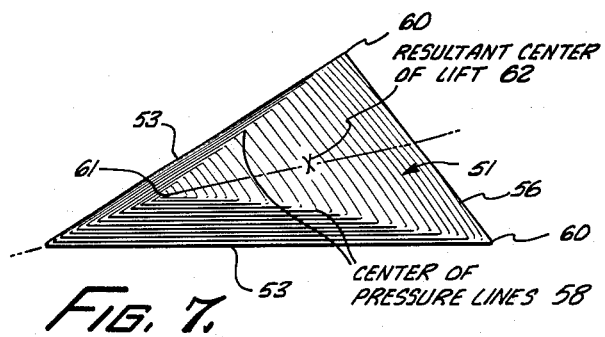
FIG. 7 is a perspective view of the hydrofoil apparatus of FIG. 5 showing the contour lines on the upper surface thereof.

The hydrofoil apparatus of FIGS. 5, 6 and 7 is primarily useful for operation under the surface of the water and produces large lifting forces (derived mostly from the top surface 51) with relatively small drag forces. This hydrofoil apparatus also has a very wide range of permissible angles to attack of the body member 50. The reasons for this wide range of permissible angles of attack are not completely understood, but it is believed that the configuration of the center of pressure lines on the top surface and the varying chord lengths of the delta-shaped body member are responsible in a large part for this phenomenon. Two center of pressure lines 58 (see FIG. 7) result when the body member 50 is moved relative to the water. The center of pressure of lines substantially follow the ridges of maximum projection of the top surface and extend from the junction 60 of the leading and trailing edges to an appex 61 along the longitudinal axis of the body member and near the front end thereof. The resultant center of lift 62 is disposed between the center of pressure lines 58. As the angle of attack of the body member 50 is increased, the center of pressure lines 58 change position to move the apex 61 along the longitudinal axis X—X toward the rear of the body member. However, even with large changes in the angle of attack, of the body member 50, the position of the resultant center of lift 62 is changed very little. As a result the angle of attack of the body member 50 can be varied through a very wide range without loss of a substantial portion of the lift created on the top surface. Experiments have also shown that while cavitation does take place on the top surface of the body member 50 toward the trailing edge 56 thereof as the angle of attack of the body member is increased, this cavitation occurs only over a small portion of the top surface area and does not destroy the effective lift of the top surface even at relatively high speeds and large angles of attack. A further important advantage results with the hydrofoil apparatus of FIGS. 5, 6 and 7 because the resultant center of lift is located an appreciable distance from the center of pressure lines 58. The strut 23 connected over the center of lift 62 is not disposed in the lowest pressure region of the top surface of the body member 50 as is the case of the strut arrangement in the prior art apparatus (see FIGS. 3 and 4). As a result, very little air, if any, is drawn from the strut 23 into the low pressure region adjacent to center of pressure lines 58 and thus strut spoilage is not an important problem in the delta-shaped hydrofoil apparatus of FIGS. 5, 6 and 7.

While the hydrofoil apparatus of FIGS. 5, 6 and 7 is very useful for producing high lift at relatively low speeds, the body member 50 must be maintained below the surface of the water since a large portion of the lift of the apparatus is lost when the top surface is exposed to the atmosphere.

Figure 11:
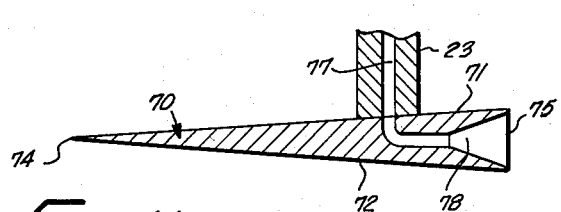
FIG. 11 is a cross-sectional view of the apparatus of FIG. 9 taken along lines 11—11.
Figure 9:
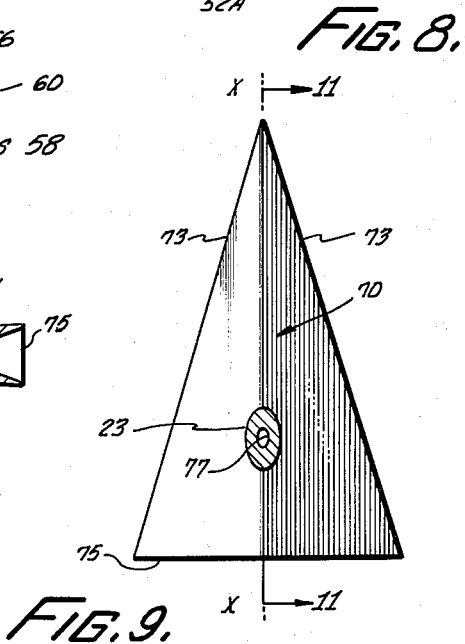
FIG. 9 is a plan view of another embodiment of the apparatus of this invention.
Figure 10:
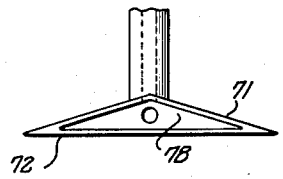
FIG. 10 is an end view of the apparatus of FIG. 9.

A hydrofoil apparatus that is useful above and below the surface of the water is shown in FIGS. 9, 10 and 11, in which a delta-shaped body member 70 is constructed with a top surface 71 which is convex along each transverse cross-section and a bottom surface 72 which is substantially flat. The distance between the top and bottom surfaces 71 and 72 increases along each longitudinal cross-section from leading edges 73 to a trailing edge 75 to increase the angle of attack of the bottom surface 72 while maintaining the angle of attack between the top surface 71 and the water relatively small to reduce drag forces on the top surface. The leading edges 73 converge at the front 74 of the body member as shown. This hydrofoil apparatus derives most of its lift from the pressure created on the bottom surface 72 and thus may be used on or under the surface of the water with little change in the effective lift or drag forces. For this reason, the hydrofoil apparatus of FIGS. 9, 10 and 11 is very useful with ocean-going boats where large waves are encountered. To further reduce the drag forces of this type of hydrofoil apparatus, a fluid such as air may be introduced into the space immediately behind the body member or trailing edge 75 to decrease the vacuum created in this space. For example, air may be introduced into this space by providing a bore 77 in the strut 23 and a cooperating bore 78 in the body member 70, as shown in FIG. 11. The bore 77 may be opened to atmosphere adjacent to the boat or may be coupled to any means for driving gas, or other fluid, through the bores 77 and 78 which will aid in propelling the hydrofoil apparatus and the boat through the water.

Figure 12:
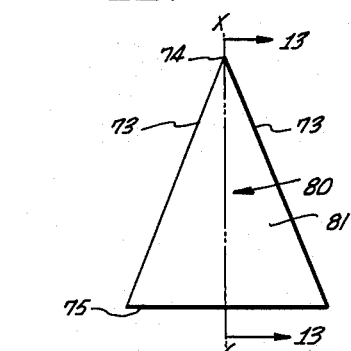
FIG. 12 is a plan view of another embodiment of the present invention.
Figure 13:
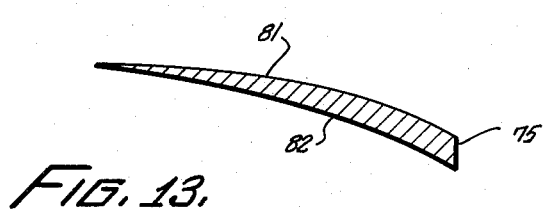
FIG. 13 is an enlarged cross-sectional view of the apparatus of FIG. 12 taken along lines 13—13.

A modification of the hydrofoil apparatus of FIG. 9 is illustrated in FIGS. 12 and 13, in which a body member 80 is constructed with top and bottom surfaces 81 and 82, respectively, which are convex and concave, respectively, along each longitudinal cross-section. This configuration of hydrofoil apparatus provides a relatively high lift characteristic for the top surface 81 while maintaining a high impulse lift on the bottom surface 82. The hydrofoil apparatus of FIGS. 12 and 13 does not employ any air introducing means as shown in FIGS. 9, 10 and 11. However, such air introducing means may be provided if desired.

Figure 14:
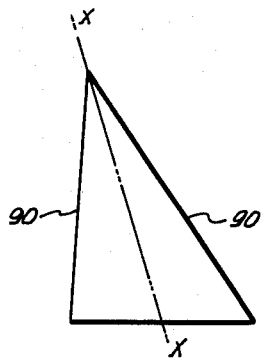
FIG. 14 is a plan view of a hydrofoil apparatus in accordance with this invention.
Figure 15:
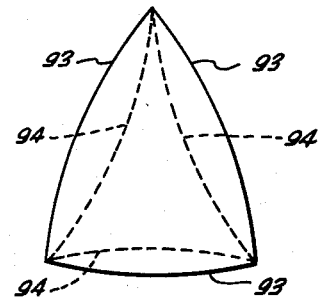
FIG. 15 is a plan view of a hydrofoil apparatus in accordance with this invention.

It is, of course, not necessary that the delta-shaped body member of the present invention be in the shape of an isosceles triangle in plan view, but it may take the form shown in FIG. 14 of a right triangle in which the leading edges 90 are disposed symmetrically with respect to the longitudinal axis X—X. Also, the leading and trailing edges of the body member need not be straight lines, but may be curved in a convex or concave configuration as shown in FIG. 15, by the solid and dashed lines 93 and 94 respectively.

Figure 16:
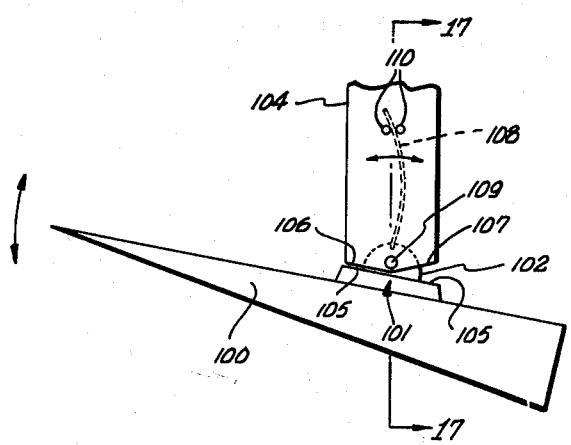
FIG. 16 is a side view of an adjustable strut assembly in accordance with this invention.
Figure 17:
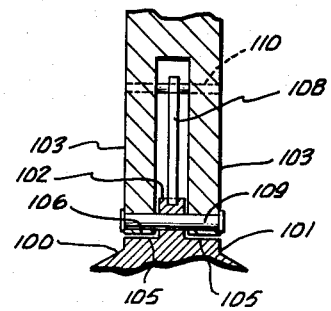
FIG. 17 is a cross-sectional view of the apparatus of FIG. 16 taken along lines 17—17.

Referring now to FIGS. 16 and 17, there is shown a hydrofoil apparatus for providing an automatic adjustment of the angle of attack of a body member 100 (which may be similar to the body members described in connection with FIGS. 4 and 8). A mounting member 101 is suitably secured to the top of body member 100, for example, by welding. This mounting member 101 includes an upwardly extending boss 102 which is pivotally mounted on a shaft 109 within a pair of depending arms 103 of a strut 104. A pair of shoulders 105 on the mounting member 101 are arranged to cooperate with tapered ends 106 and 107 of the arms 103 to limit the movement of the body member 101. The tapered ends 106 and 107 of the arms 103 extend upwardly and outwardly from the shaft 109 to permit the body member 100 to rotate about the shaft 109 a predetermined amount. A damper spring 108 is connected at one end to the boss 102 and is disposed between a pair of stop pins 110 at the other end for biasing the body member 100 in a preselected (central) position and for damping out oscillations of the body member 100.

In operation, the body member 100 is rotated in a clockwise direction until the shoulders 105 engage the ends 106 of the arms 103 to provide a maximum angle of attack of body member 100 at low speeds when the body member is running below the surface of the water. When the body member 100 has reached the surface of the water (at relatively high speeds), the body member 100 is rotated in a counterclockwise direction (as a result of the increased lift on the rear portion of the lower surface), to decrease the angle of attack until the maximum speed is reached, at which time the shoulders 105 will engage the ends 107 of the arms 103. This type of body member and strut assembly is highly useful to provide a high lift to hold a boat above the surface of the water when the body member 100 is moving at slow speeds and small drag forces when the body member 100 is moving at high speeds and thus riding on the surface of the water.

Various modifications of the hydrofoil apparatus of the present invention will be apparent to those skilled in the art. For example, the hydrofoil apparatus of the present invention may be employed to support any vessel (i.e. an airplane or submarine), or other body in water. The body members of the apparatus may be utilized as water skis for directly supporting a person above the surface of water.

There has thus been disclosed an improved hydrofoil apparatus which is highly efficient, stable, versatile and inexpensive to manufacture.

We claim:
1. A hydrofoil apparatus for lifting a boat in water comprising a plurality of delta shaped body members, each of the body members having an upper and lower surface which converge to form a pair of thin leading edges intersecting at the front of the body member and being disposed symmetrically with respect to the longitudinal axis thereof so that the projection of the leading edges onto a plane perpendicular to the longitudinal axis is symmetrical with respect to the longitudinal axis, each of the body members being constructed so that the distance between the upper and lower surfaces thereof increases along substantially each longitudinal cross-section from the leading edges to the rear of the body member to increase the impulse lift on the bottom surface and reduce drag forces on the top surface thereof, the top surface of each of the body members being convex in shape along each transverse cross-section of the body member, and a strut member connected individually between each body member and the boat for holding the body member in a preselected position below the boat so that the front ends of the body members are aligned with the direction of travel of the boat and for transmitting the lifting forces produced by the body members to the boat.

2. A hydrofoil apparatus as defined in claim 1 wherein each of upper and lower surfaces of each body member are convex and concave, respectively, in shape along each longitudinal cross-section of the body members.

3. A hydrofoil apparatus as defined in claim 1 including means for introducing a fluid material into the space immediately behind each body member to decrease the vacuum created in said space and thereby decrease the drag on each body member.

4. An apparatus as defined in claim 1 wherein each of the strut members are pivotally connected to the respective body members to permit the body members to rotate a predetermined amount relative to the strut members to change the angle of attack of the body members and including spring bias means coupled between each of the body members and the respective strut members to bias the body members in a preselected angle of attack.

5. An apparatus for producing lift by motion in a liquid medium comprising a delta shaped body member having a longitudinal axis and an upper and lower surface which converge at an acute angle along the forward extent of the body member to form a pair of thin leading edges disposed symmetrically with respect to the longitudinal axis of the body member so that the projection of the leading edges onto a plane perpendicular to the longitudinal axis is symmetrical with respect to the longitudinal axis, the body member being constructed so that the distance between the upper and lower surfaces increases along substantially each longitudinal cross-section from the leading edges to the rear of the body member to increase the impulse lift on the lower surface and reduce the drag forces on the upper surface, the acute angle at which the body member upper and lower surfaces converge along the leading edges providing high lift to drag ratio for the body member.

6. An apparatus as defined in claim 5 wherein the body member is constructed so that the upper and lower surfaces thereof are convex and concave, respectively, along each longitudinal cross-section.

7. An apparatus as defined in claim 5 wherein the upper surface of the body member is convex in shape along substantially each transverse cross-section and wherein the distance between the upper and lower surfaces decreases from the center of the body member to the leading edge along substantially each transverse cross-section.

8. An apparatus as defined in claim 7 wherein the lower surface of the body member is substantially flat.

9. An apparatus as defined in claim 8 wherein the top surface is comprised of two substantially flat side portions which extend upwardly and rearwardly from the leading edges along sections longitudinally of the body member and intersect each other at an obtuse angle along the longitudinal axis of the body member.

10. An apparatus for producing lift by motion in a liquid medium comprising a delta shaped body member having an upper and lower surface which converge to form a pair of thin leading edges disposed symmetrically with respect to the longitudinal axis of the body member, the leading edges converging at the front of the body member so that the transverse distance between the edges increases from the front to the rear of the body member, the upper surface of the body member being convex in shape along each transverse cross-section, the distance between the upper and lower surfaces of the body member increasing along, substantially each longitudinal cross-section from the leading edges to the rear of the body member and the distance between the upper and lower surfaces decreasing from the center of the body member to the leading edges along each transverse cross-section, a strut member connected to the upper surface of the body member and disposed above the center of lift thereof, the strut member defining a passageway through a portion thereof communicating to atmosphere at a location spaced from the body member, the body member defining a passageway communicating between the rear portion thereof and the strut member passageway whereby atmospheric air introduced into the strut member passageway will be drawn through the passageways from said location to the rear of the body member to reduce the partial vacuum created along the rear of the body member when the body member is moved through a liquid medium.

References Cited in the file of this patent

UNITED STATES PATENTS

| | | |
|---|---|---|
| 1,190,755 | Hahn | July 11, 1916 |
| 1,776,700 | Pegna | Sept. 23, 1930 |
| 1,815,303 | Kloen | July 21, 1931 |
| 1,923,958 | Wesnigk | Aug. 22, 1933 |
| 2,408,788 | Ludington et al. | Oct. 8, 1946 |
| 2,422,098 | Heintzelman | June 10, 1947 |
| 2,422,388 | Billings | June 17, 1947 |
| 2,682,925 | Wosika | July 6, 1954 |
| 2,684,654 | Johnson | July 27, 1954 |
| 2,715,000 | Janney | Aug. 9, 1955 |
| 2,749,869 | Bush | June 12, 1956 |
| 2,767,678 | Vertens | Oct. 23, 1956 |
| 2,795,202 | Hook | June 11, 1957 |
| 2,858,788 | Lyman | Nov. 4 1958 |
| 2,890,672 | Boericke | June 16, 1959 |
| 2,942,810 | Hanning-Lee et al. | June 28, 1960 |
| 3,016,863 | Johnson | Jan. 16, 1962 |
| 3,044,432 | Wennagel et al. | July 17, 1962 |

FOREIGN PATENTS

| | | |
|---|---|---|
| 382,812 | Great Britain | Nov. 3, 1932 |
| 795,223 | France | Jan. 2, 1936 |
| 458,111 | Great Britain | Dec. 14, 1936 |
| 516,651 | Great Britain | Jan. 8, 1940 |
| 124,583 | Sweden | Apr. 5, 1949 |
| 715,880 | Great Britain | Sept. 22, 1954 |
| 549,266 | Italy | Oct. 9, 1956 |
| 1,179,702 | France | Dec. 22, 1958 |